(12) United States Patent
Yu et al.

(10) Patent No.: US 7,262,963 B2
(45) Date of Patent: Aug. 28, 2007

(54) WATER-AND-DUST PROOF STRUCTURE FOR A NOTEBOOK COMPUTER HEAT SINK

(75) Inventors: Wen-Chan Yu, Taipei (TW); Shu-Shian Liau, Taipei (TW)

(73) Assignee: Twinhead International Corp., Taipei (TW)

( * ) Notice: Subject to any disclaimer, the term of this patent is extended or adjusted under 35 U.S.C. 154(b) by 0 days.

(21) Appl. No.: 11/384,374

(22) Filed: Mar. 21, 2006

(65) Prior Publication Data

US 2006/0262507 A1 Nov. 23, 2006

(30) Foreign Application Priority Data

May 17, 2005 (TW) ................. 94207924 U

(51) Int. Cl.
*G06F 1/20* (2006.01)
(52) U.S. Cl. .................. 361/687; 257/712; 165/80.3
(58) Field of Classification Search ............... 257/712, 257/706, 730, 774; 324/450, 760; 165/80.3, 165/121; 361/751, 752, 695, 704, 724–727, 361/679–687
See application file for complete search history.

(56) References Cited

U.S. PATENT DOCUMENTS

2004/0118500 A1* 6/2004 Wang ..................... 156/60

2004/0212080 A1* 10/2004 Chen et al. .................. 257/712
2006/0114656 A1* 6/2006 Takeuchi ..................... 361/704
2006/0262505 A1* 11/2006 Cheng ......................... 361/700

* cited by examiner

*Primary Examiner*—Hung Van Duong
(74) *Attorney, Agent, or Firm*—Bacon & Thomas, PLLC

(57) ABSTRACT

The present invention is to provide a water-and-dust proof structure for a notebook computer heat sink having a chip set and a heat sink module, characterized by comprising (between the chip set and the heat sink module): a separation plate comprising a receptacle having a prescribed hole therein, the separation plate cooperating with a casing of the notebook computer to form a space inside the notebook computer so that the heat sink module and the chip set on the main board of the notebook computer are separatedly located in different spaces inside the notebook computer and closely contact each other through the receptacle of the separation plate; a resilient frame formed to cooperate with the receptacle of the separation plate and having a prescribed hole therein; a resilient piece formed to cooperated with the prescribed hole and having multiple resilient curve portions; and arranging the resilient frame into the receptacle of the separation plate, the heat sink module cooperating with the resilient piece to connect with the chip set through the prescribed hole and fixed on the separation plate.

1 Claim, 3 Drawing Sheets

WATER-AND-DUST PROOF STRUCTURE FOR A NOTEBOOK COMPUTER HEAT SINK

BACKGROUND OF THE INVENTION

1. Field of the Invention

The present invention relates in general to a notebook computer heat sink structure. In particular, the present invention relates to a notebook computer heat sink having a water-and-dust proof structure.

2. Description of the Related Art

A notebook computer which is in small volume and convenient for users to carry has been widely used by the consumers. Following the advance of the chips' effects in a notebook, the heat produced by the chips increases. To prevent the chips' effects from adversely affecting by the heat, heat dissipation becomes a necessary condition to promote and protect the calculation speed of the chips. Therefore, a heat sink is an indispensable element for a contemporary computer. A prior art heat sink for a chip element is a fin-like heat sink. It cooperates with a fan, a water-cool element or a heat-pipe to dissipate the heat from the chip. An air-cool heat sink module will carry the dust from outside into the notebook computer by the fan causing element pollution inside the notebook computer.

It is an import object of the invention to protect the inside elements of the notebook computer from adversely affecting in terms of effects and life-span under a normal or an adverse circumstance based on the object of water-and-dust proof effects.

SUMMARY OF THE INVENTION

Accordingly, an object of the present invention is to provide a water-and-dust proof structure for a notebook computer heat sink which computer includes a separation plate having a receptacle between the chip set and the heat sink module. A resilient frame is accepted inside the receptacle. Each one of the separation plate and the resilient frame includes a prescribed hole. The heat sink module cooperating with a resilient piece connects with the chip set through the prescribed holes and is fixed on the separation plate to form an integrated body. Even though outside pollutants (such as water and dust) come from the casing into the notebook computer, the separation plate forms another space inside the notebook computer so as to form a secondary protection to prevent the main board from direct pollution which may adversely affect the operation and life-span of the notebook computer and thus water-and-dust proof effects are achieved.

The present invention can be more fully understood by reading the subsequent detailed description and examples with references made to the accompanying drawings.

DETAILED DESCRIPTION OF THE PREFERRED EMBODIMENT

Figure 1:
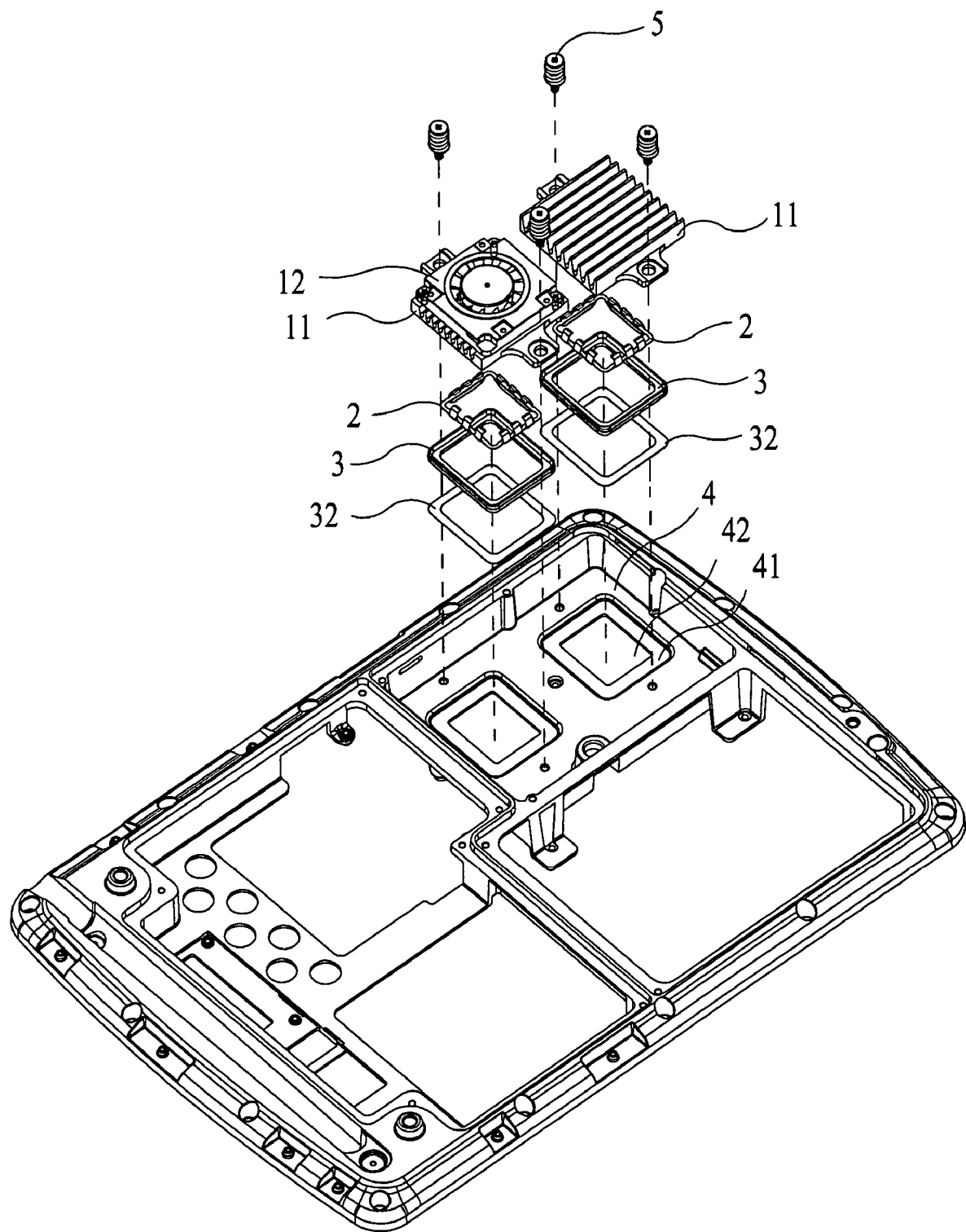
FIG. 1 is an explosive view of the structure according to the present invention.
Figure 2A:
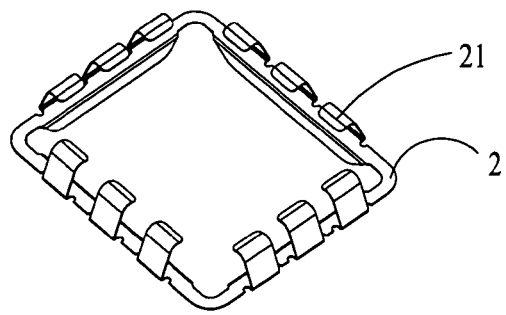
FIG. 2a is a skeptical view of the resilient piece according to the present invention.
Figure 2B:
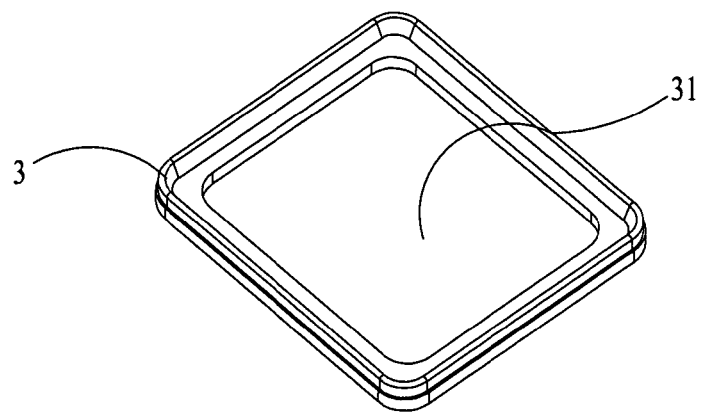
FIG. 2b is a skeptical view of the resilient frame according to the present invention.
Figure 2C:
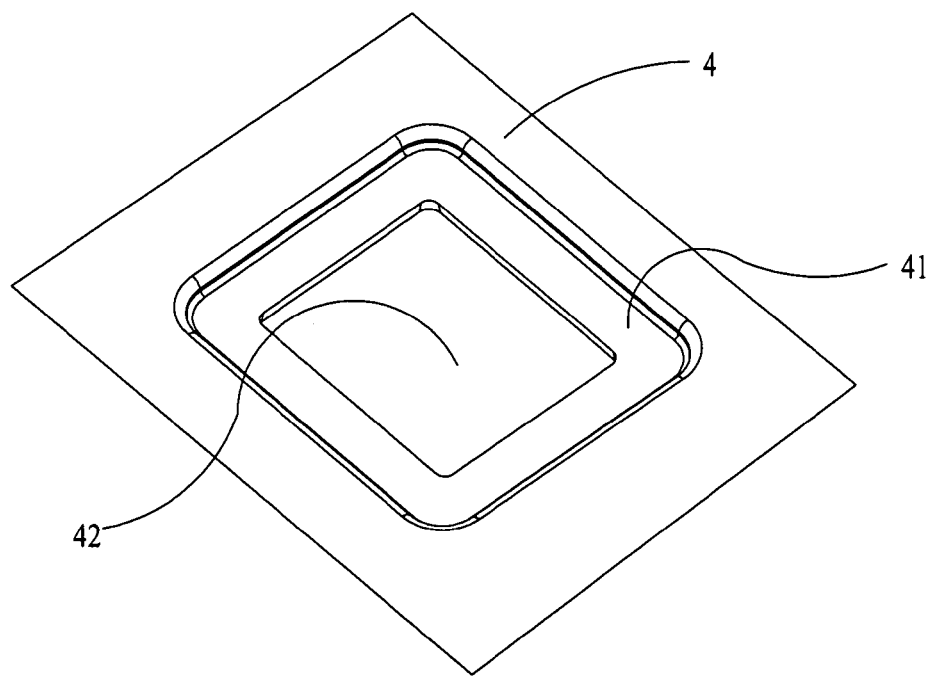
FIG. 2c is a skeptical view of the separation plate according to the present invention.
Figure 3:
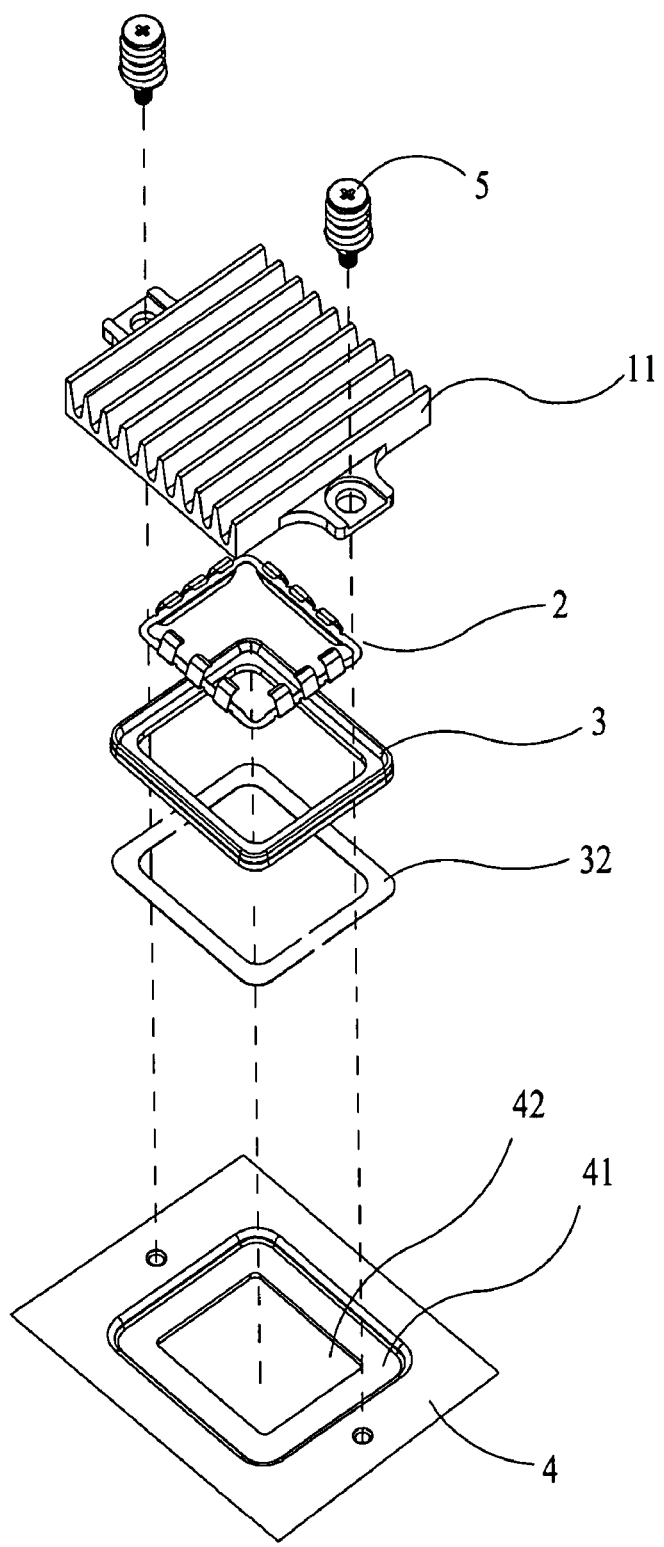
FIG. 3 is a skeptical view of the elements according to the present invention.

Referring to FIG. 1, an explosive view of the structure according to the present invention is shown. The structure includes a separation plate 4 having a receptacle 41. The receptacle 41 has a prescribed hole 42 in its center (as shown in FIG. 2c). A resilient plastic frame 3 cooperates with the form of the receptacle 41 of the separation plate 4 and includes a prescribed hole 31 similar to the prescribed hole 42 of the separation plate 4. The resilient frame 3 is suitable to be accepted into the receptacle 41 of the separation plate 4 (as shown in FIG. 2b). A water-proof double faced adhesive tape is mounted between the separation plate 4 and the resilient frame 3 to enforce the connection stability between the plate 4 and the frame 3. A resilient piece 2 cooperates with the form of the prescribed holes 31 and 41 and includes multiple resilient curve portions 21. The resilient piece 2 also performs a ground connection to prevent the electromagnetic radiation from leaking out thus preventing the functions of the receiving and sending equipment from undue interfering (as shown in FIG. 2a). A fin-like heat sink piece 11 cooperates with the resilient piece and the resilient frame 3 and is closely fixed on the plate 4 by resilient screw 5 (as shown in FIG. 3).

Heat source, that is, a chip set (not shown), conducts the heat from the prescribed hole 42 in the receptacle 41 of the separation plate 4 to the fin-like heat sink 11 and then the heat is expelled outside the computer by the fan 12. The separation plate 4 which is located above the main board (not shown) provides a suitable supporting strength to prevent the main board from deforming and to cause intimate connection between the heat sink and the heat source. Meanwhile, another space is formed inside the notebook computer by the plate 4. Even though outside pollutants (such as water and dust) come from the casing into the notebook computer, the separation plate 4 cooperates with the resilient piece 2 and the resilient frame 3 to prevent the main board from directly polluting by the pollutants which may adversely affect the operation and life-span of the notebook computer. Accordingly, a notebook computer heat sink having the water-and-dust proof effects is achieved.

Although the present invention has been particularly shown and described above with reference to the preferred embodiment, it is anticipated that alterations and modifications thereof will no doubt become apparent to those skilled in the art. It is therefore intended that the following claims be interpreted as covering all such alteration and modifications as fall within the true spirit and scope of the present invention.

What is claimed is:

1. A water-and-dust proof structure for a notebook computer heat sink having a chip set and a heat sink module, characterized by comprising (between the chip set and the heat sink module):

a separation plate comprising a receptacle having a prescribed hole therein, the separation plate cooperating with a casing of the notebook computer to form a space inside the notebook computer so that the heat sink module and the chip set on the main board of the notebook computer are separatedly located in different spaces inside the notebook computer and closely contact each other through the receptacle of the separation plate;

a resilient frame formed to cooperate with the receptacle of the separation plate and having a prescribed hole therein; and a resilient piece formed to cooperated with the prescribed holes and having multiple resilient curve portions; and wherein the resilient frame is mounted into the receptacle of the separation plate so that the heat sink module cooperates with the resilient piece to connect with the chip set through the prescribed hole and fixed on the separation plate.

* * * * *